United States Patent
White et al.

(10) Patent No.: US 7,159,764 B1
(45) Date of Patent: Jan. 9, 2007

(54) VERSATILE WINDOW SYSTEM FOR INFORMATION GATHERING SYSTEMS

(75) Inventors: Ryan R. White, Ankeny, IA (US); Christopher D. Cleland, Cedar Rapids, IA (US); Kraig D. Brody, Cedar Rapids, IA (US); Bradley E. Eckley, Ely, IA (US); William C. Woodburn, Muscatine, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 10/858,504

(22) Filed: Jun. 1, 2004

Related U.S. Application Data

(60) Provisional application No. 60/474,804, filed on May 30, 2003.

(51) Int. Cl.
*G06F 17/00* (2006.01)
(52) U.S. Cl. .................... 235/375; 235/462.32
(58) Field of Classification Search ........... 235/472.01, 235/462.32, 462.36, 462.43–44, 462.45, 235/454, 375, 376
See application file for complete search history.

(56) References Cited

U.S. PATENT DOCUMENTS

| | | | | |
|---|---|---|---|---|
| 4,971,410 A * | 11/1990 | Wike et al. | ..................... | 359/17 |
| 5,539,194 A * | 7/1996 | Miller et al. | ............ | 235/472.02 |
| 5,572,007 A * | 11/1996 | Aragon et al. | .......... | 235/462.35 |
| 5,828,052 A * | 10/1998 | Reynolds et al. | ....... | 235/472.01 |
| 6,131,815 A * | 10/2000 | Zigler | .................... | 235/472.01 |
| 6,497,368 B1 * | 12/2002 | Friend et al. | ........... | 235/472.01 |

* cited by examiner

*Primary Examiner*—Steven S. Paik
(74) *Attorney, Agent, or Firm*—Shook, Hardy & Bacon LLP

(57) ABSTRACT

A method and apparatus for permitting a base housing to support a plurality of different product configurations. Some of the configurations include different types of optical indicia readers. The base housing has a reading portal capable of receiving a window frame. The window frame is designed for use with a specific type of optical indicia reading component. The invention permits efficient manufacturing of the housing prior to determining which type of optical indicia reader the housing will house.

24 Claims, 4 Drawing Sheets

VERSATILE WINDOW SYSTEM FOR INFORMATION GATHERING SYSTEMS

CROSS REFERENCE TO RELATED APPLICATIONS

This application claims the benefit of U.S. Provisional Application No. 60/474,804, filed May 30, 2003. The content of U.S. Provisional Application No. 60/474,804, filed May 30, 2003, including any and all drawings, written description, claims and appendices, is hereby incorporated herein in its entirety by this reference.

BACKGROUND OF THE INVENTION

Devices containing optical indicia readers are well known. Several different types of optical indicia reader are currently available for use in such devices. For example, data gathering devices exist that contain a laser scanner type of reader or an area-type reader. Different readers may use different wavelengths of light or may read at different ranges. Further, the same general style of optical reading component can often be found in different form factors.

It is frequently the case that a specific type of reader component will work best with a specific type of window or window orientation. Thus, different windows or window orientations can be needed for use with different reader components. As a result, housing and window systems are manufactured to suit the particular type of optical indicia reader to be used therein. This approach makes it quite difficult and costly to offer different product configurations having different types of optical reader components.

A prior symbology reader system is known that employs a user-replaceable window system. Such a system is disclosed in U.S. Pat. No. 5,572,007, issued Nov. 5, 1996, to Aragon et al. The Aragon system provides a user-replaceable window to facilitate, for example, replacement of a damaged window. Aragon, however, does not teach the use of different types of optical indicia reader components in different configurations of a base housing.

Consequently, a new information handling device is needed that can be efficiently manufactured and that can accommodate various configurations offering different optical indicia reading components. For example, an information gathering device capable of housing in different configurations either a laser scanner or a digital imager is needed. It is also desired to create an information handling device that can be easily and quickly customized with a window appropriate for the type of optical indicia reader that it will house in a given configuration. Further, it is believed that a review of this specification, including its claims and drawings, will reveal and imply additional deficiencies of the prior systems that are improved or remedied by the inventions disclosed herein.

SUMMARY OF THE INVENTION

This specification presents embodiments related to an information gathering device capable of being easily, efficiently and economically manufactured to accommodate any of a variety of different optical indicia reader components. The inventions permit a plurality of different product configurations to be offered while reducing the risks and minimizing the cost of doing so. A single base housing is created for a given product line. Additional, lower cost components such as reading windows or window frames can be used to create a desired configuration of the product quickly and at a lower cost. Further, reference to the accompanying drawings, detailed description and claims will reveal additional features related to the various embodiments.

DETAILED DESCRIPTION

Figure 1:
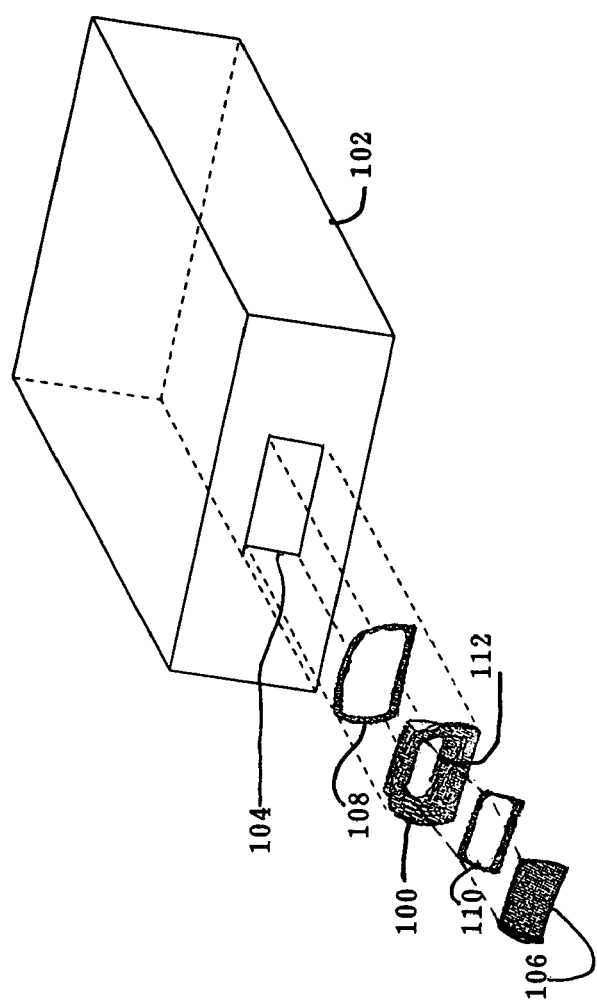
FIG. 1 depicts parts involved in creating a product configuration containing an optical indicia reader.

It will be appreciated that all of the inventions of the present disclosure can be used in conjunction with a wide variety of information gathering systems. The information gathering device can be any device designed to include an optical indicia reading component as an option. Although the inventions may be described at times with reference to a portable and hand-held device, the inventions can also be used with a non-handheld, a body-mounted or even a non-portable device.

The information gathering device of this detailed description can also optionally include one or more other features. The other features can include, for example, keyboards, keypads, touch screens, digitizer screens, other stylus or touch input surfaces or screens, visual display components, a great variety of radio frequency transceivers, infrared communication components, speakers, microphones, telephonic communication components, modems, docking connectors, removable memory components, RFID readers, or other such components. In addition, copending application Ser. No. 10/307,221, filed Nov. 29, 2002, discloses several additional examples of an information gathering device including radio frequency transceivers and other components. Consequently, application Ser. No. 10/307,221, filed Nov. 29, 2002, is hereby incorporated herein in its entirety, including all drawings, description, claims and appendices, by this reference. The numerous embodiments of incorporated application Ser. No. 10/307,221, filed Nov. 29, 2002, present additional examples of a portable, hand-held information gathering device with which the present inventions can be used.

The optical indicia reading components referred to throughout this detailed description can be any of a wide variety of components capable of imaging or reading an optical indicia or visual image. For example, the optical indicia reader can be a component that generates its own illumination and directs it toward the indicia to be illuminated and imaged. Alternatively, the optical indicia reader can be a component that does not generate its own illumination, but relies on some external source or ambient light to illuminate the indicia or image. By way of further example, the optical indicia reader can be any of a great variety of laser scanners. Alternatively, the optical indicia reader can be a device reading an entire region or area essentially instantaneously (as opposed to rastering or scanning a light point, such as a laser generated light, sequentially over an indicia being imaged or read). Examples of an area-type reader (sometimes also referred to as two-dimensional or 2D readers) include any of the wide variety of digital imagers. Of course, all such optical indicia readers offered with a given base housing should be of a size and shape permitting it to be housed within the space allotted it within the housing.

The present inventions are designed to be used with a base information gathering device that is available in a plurality of configurations. One configuration in a product line might not include an optical indicia reader. Another configuration in that product line, however, may use the same base housing but does include an optical indicia reader (one of the scanning or area type of readers for example). Yet another configuration again uses the same base housing, but includes an optical indicia reader component that is different from the optical indicia reader included in the second configuration. For example, one configuration may include a scanning type of reader and another configuration may include a different type of scanning reader or an instantaneous area-type reader. Another configuration may include an optical indicia reader that relies on ambient light to illuminate an image to be imaged. If desired, a fourth, fifth or a plurality of additional configurations can also be offered in a product line. Alternatively, if desired, every offered configuration can include an optical indicia reader and a configuration without an optical reader may not be offered.

It will be appreciated that any of a wide range of different sets of configurations can be offered with a base information gathering device. One product may be offered in only two different configurations. A different offering or product may come in three different configurations. Other products or offerings may be available in four, five or more different configurations.

As noted above in the background section, a problem arises when offering a base information gathering component with a choice of two or more different optical indicia readers. Different types of optical indicia readers require different types of windows and different orientations of that window to the optical indicia reader. For example, a laser scanner generally should have a window that is at an angle to the beam of laser light. The size of the angle is dependent upon the distance between the window and the laser scan engine. An area-type imager or reader, however, generally should have a window that is perpendicular to the light energy. If a laser scanner was used with a window oriented perpendicularly to the laser ling beam, the outgoing laser light would be reflected back into the unit by the window. Further, some types of optical readers or reading applications can be optimized by having a window with certain optical properties such as filtering, color or transmissivity.

Further, in order to minimize manufacturing cost, it is often desirable to have the various components, such as the housing of the information gathering device, manufactured in large batches and sufficiently ahead of when they will be needed. To even further minimize cost, such manufacturing is often done overseas or a significant distance from the point of sale.

As a result, the manufacturing of portions of the information gathering device, such as the housing for example, must often be carried out before having sufficient information about what the demand will be for the various product configurations that will be offered. This poses a special problem when one of the configurations includes an optical indicia reader and another of the configurations includes a different optical indicia reader requiring a different window and/or different window orientation.

FIG. 1 depicts an embodiment of the present invention employing a window frame 100. FIG. 1 shows a base housing 102 for an information gathering device. The housing 102 is designed to support a variety of different configurations, as discussed above, of the information gathering device. The housing 102 includes a portal 104 through which optical indicia can be read or imaged. An appropriate reading window 106 is seated in the window frame 100. The window frame 100 is seated in the portal 104. The order in which this construction is performed is not significant, but it may be easier in some circumstances to first join the window 106 to the window frame 100 and then seat that combination in the portal 104.

It will be appreciated that the joining of the window 106 to the window frame 100 can be accomplished in a variety of ways depending on the particular application at hand and the materials involved. For example, the parts can be designed to snap together. Alternatively, a variety of other mechanical means can be used such as slots, screws, clamps, etc. By way of further example, adhesives, chemical bonding or even heat bonding can be used in the appropriate circumstances.

In a hand-held, portable information gathering device, it is often desirable to have a unit that is sealed against the environment. If desired, this can be accomplished, for example, by using a sealing adhesive or adhesive gasket 108 to secure the window frame 100 to the portal 104. Likewise, an appropriate adhesive or adhesive gasket 110 can also be used to secure and seal the window 106 to the window frame 100. Other systems can also be used to seal the unit.

The window frame 100 depicted in FIG. 1 has a frame portal 112 that is angled. If, however, a window with a greater or lesser angle is needed for the optical indicia reader of the configuration being constructed, a different frame having the appropriate frame portal angle can be used in the place of the depicted window frame 100. For example, if a window perpendicular to the light energy is needed, a window frame with no slant can be used. Various numbers of different window frames, each designed to be used in conjunction with a particular type of optical indicia reader can be manufactured and kept on hand for use as the window frame 100 in the system of FIG. 1.

Figure 2:
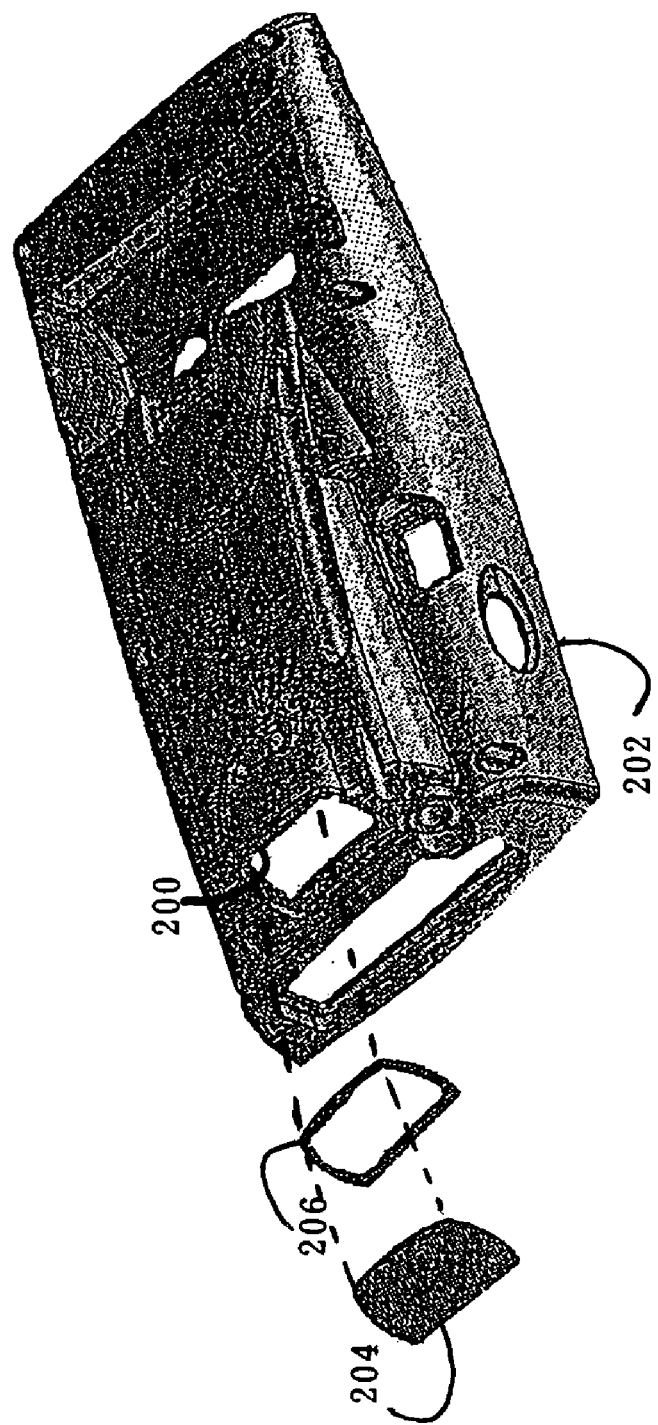
FIG. 2 depicts parts involved in creating a different product configuration containing an optical indicia reader.

FIG. 2 depicts an alternate embodiment of the invention described in relation to FIG. 1. In this alternate and elegant embodiment, the portal 200 in the base housing 202 is designed to receive a window 204 and orient that window 204 at an angle required by one of the types of optical indicia reader anticipated to be housed therein. For example, if it is anticipated that an area-type reader requiring a window oriented perpendicularly ("no slant") to the light energy will be included in one or more product configurations, the portal 200 can be manufactured to receive a window and hold it perpendicularly without the use of a window frame. The window 204 can be joined to the portal 200 in one or more of the ways described in relation to FIG. 1. In FIG. 2, an adhesive gasket 206, which can be sealing, is depicted as one possible way of coupling the window 204 to the portal 200. The portal 200, however, is also designed to accept a window frame (such as the window frame 100 of FIG. 1 for example). Therefore, when a configuration having an optical indicia reader requiring a different window orientation is being constructed, the desired angle can be obtained by using the appropriate window frame and securing the appropriate window thereto as taught in relation to FIG. 1.

In yet another embodiment, if it is anticipated that an optical reader (a laser scanner for example) requiring a window oriented at an angle (a "slant") to the light energy will be included in one or more product configurations, the portal 200 can be manufactured to receive a window and hold it at the required angle without the use of a window frame (such as 100, FIG. 1). As described above, when other angles are required or when a perpendicularly situated window is required, an appropriately angled window frame can be used to orient the window at the desired relationship to the light energy. Again, the window and any needed window frame can be coupled to each other and to the base housing using any of the methods described above in relation to FIGS. 1 and 2 as appropriate.

Figure 3:
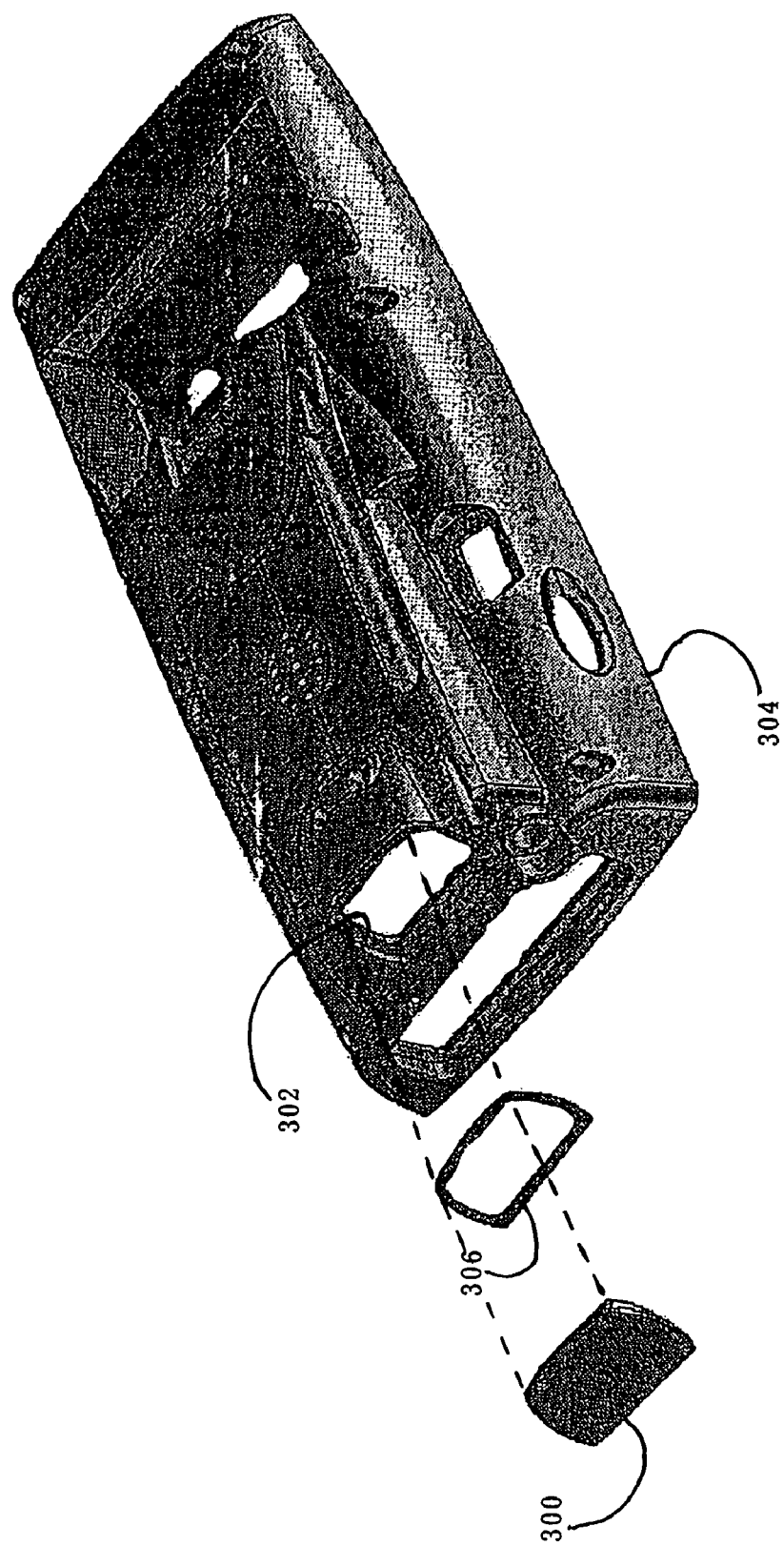
FIG. 3 depicts parts involved in creating a product configuration that does not contain an optical indicia reader.

FIG. 3 depicts an embodiment for constructing a configuration that does not include the optional optical indicia reader. In FIG. 3, a plug 300 is coupled with the reading portal 302 of the base housing 304. The plug 300 need not be made of a light-transmissive material. In addition, a window frame need not be used. If desired, however, the plug 300 can be light-transmissive and/or a window frame can be used. Again, the plug 300 can be coupled to the base housing 304 using any of the methods described above for the window of FIGS. 1 and 2 as appropriate. In FIG. 3, an adhesive gasket 306, which can be sealing, is depicted as one possible way of coupling the plug 300 to the portal 302.

The features depicted on the housing 202, 304 in FIGS. 2 and 3 are included only by way of example and are not intended to be limiting in any fashion. It will appreciated that the inventions can also be used with a wide variety of housings including all, some or none (except for the provision of some type of reading portal) of the features included in FIGS. 2 and 3. The housings of FIGS. 1, 2 and 3 can additionally or alternatively include provision for some, all or none of the features discussed in the first three paragraphs of this detailed description section as well as many other types of features not specifically noted herein. Further, the housing may be any of a great variety of sizes. It may be of a size smaller than a human hand to a size too large to be held in a hand.

Figure 4:
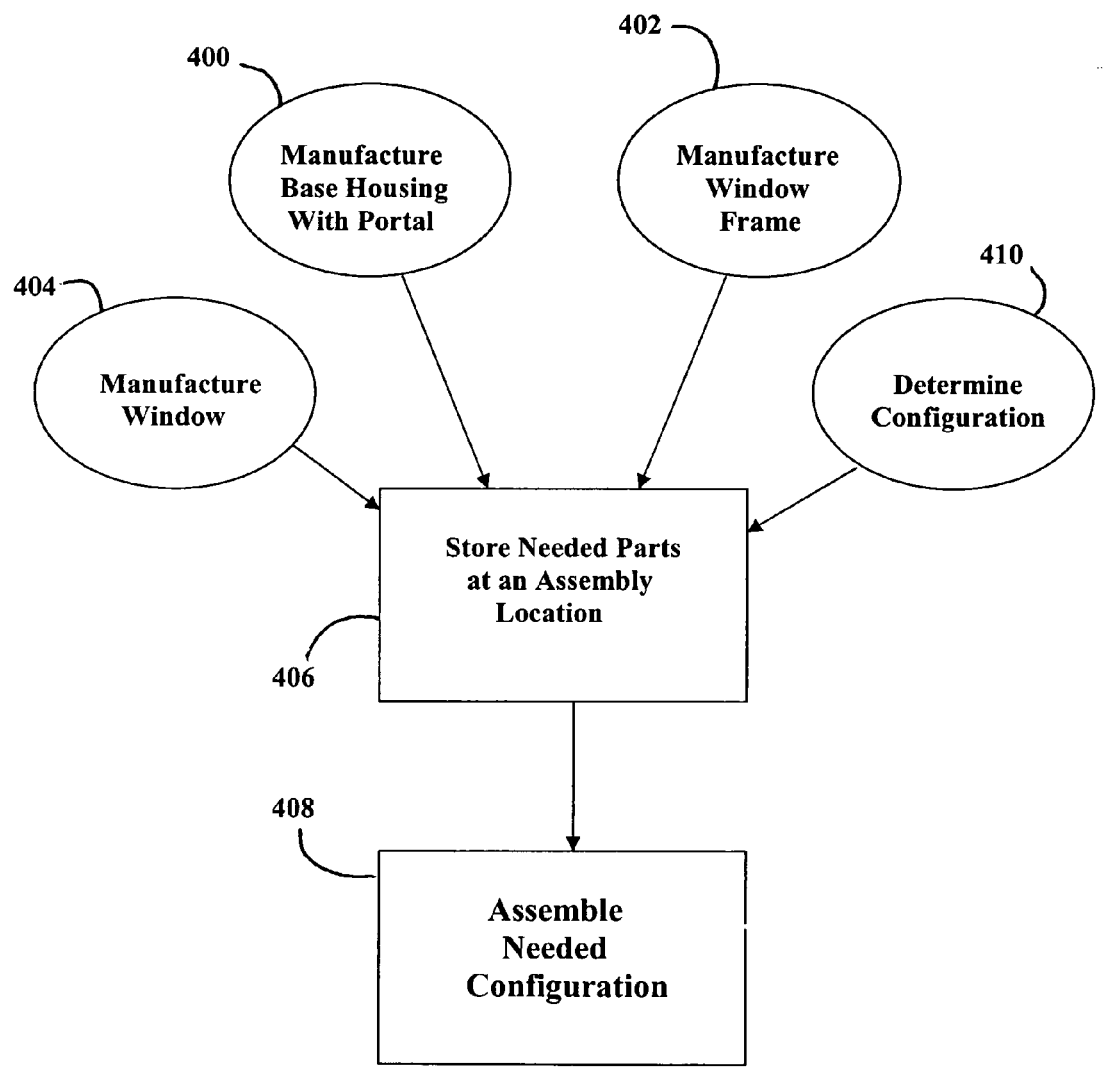
FIG. 4 is a chart illustrating the construction of a product configuration pursuant to the teachings of the present inventions.

FIG. 4 depicts a chart for manufacturing a configuration of an information gathering device in accord with the teachings presented above. As indicated by the structure of the chart, the timing or order in which many of the acts may be performed is flexible and need not be fixed. Base housings having any of the above-described types of reading portals are manufactured 400. Window frames such as those described above are also manufactured 402. Likewise, windows such as those described above are also manufactured 404. If desired, each of the three parts 400, 402, 404 can be manufactured at separate locations or at the same location. Alternatively, any two of the three parts can be manufactured at a common location and the third part can be manufactured at a separate location. In any event, the parts must all eventually be held at a common location for assembly 406. At an appropriate time, upon receiving an order for example, the parts are assembled 408 in any of the manners described above in relation to FIG. 1, 2 or 3, into a desired, specific configuration of the product. An appropriate optical indicia reader can be added to the unit at the time of assembly 408 if desired, or later.

Using the system and parts described in this detailed description or depicted in the figures, the determination as to which configuration (or configurations) to construct 410 can be postponed until some point after the manufacture of the base housing 400. The decision as to which configuration to assemble 408 can be delayed until after receiving a specific order for a configuration. This capability provides significant advantages. The decision 408, however, can alternatively be made at any point deemed appropriate. The decision 408 may be based on surveys or polling, industry-wide trends, information received from the sales force in advance of the placing of an order, the scheduled shipping date of an order, etc.

In prior systems, the base housing would be manufactured, with a reading portal and the appropriate type of window, as a single assembled unit. Major problems are generated when such an approach is used to create configurations that require different types or orientations of windows (for example, a configuration requiring a "slanted" window and another configuration requiring a "perpendicular" window). If it is desired to have units on hand when orders are placed, the number of units of each configuration (and thus each housing) to manufacture must be determined at an early date (for example, long before orders are taken). On the other hand, if it is desired to minimize inventories, manufacture of the entire base housing must be postponed until orders are received.

If the first alternative (estimating at an early date the number of each configuration that will be needed) is chosen, there is a great risk that the estimate will be inaccurate. As a result, there could be a shortage of a configuration that is unexpectedly in demand or there could be an oversupply of a configuration that does meet the expectations of the estimate. The result is lost revenue due to lost sales or due to excess inventory, increased storage demands and unnecessary manufacturing expenses.

If the second alternative (postponing manufacture of the base housing until orders are received) is chosen, unacceptable delivery delay may be created or lower cost manufacturing opportunities may have to be forfeited. If it is desired to use a distant or even overseas manufacturer, the customer will have to wait not only for an entire batch of units to be manufactured but also for the completed product to be shipped to the desired location. This delay can be significant and may result in lost sales opportunities. To speed up the manufacturing and delivery process, a manufacturer could be chosen that is not so distant and that is able to manufacture units within a short time frame. Meeting these requirements, however, may result in increased manufacturing expense. Consequently, this alternative can lead to reduced profit margins or to uncompetitive pricing resulting in lost sales.

The present inventions, however, permit the manufacture of several different product configurations without the disadvantages and problems described above. The present inventions enable the manufacture of just one type of base housing. That housing can then support a plurality of configurations. If desired, the manufacturing of the base housing, windows and frames can take place well in advance of the receipt of any orders. Further, the manufacturing can be performed by a distantly located and lower cost manufacturer if desired.

The window frame and window are generally small parts that are not expensive to manufacture. The cost of stocking a window or a window frame, for example, is just a small percentage of the cost of stocking an entire base housing. Consequently, if too many of any of the various windows or frames are manufactured, the loss will be minimal. Further, since the coupling of the base housing to the appropriate window and, if needed, window frame is not time consuming, and since it can be done at a convenient location such as a location nearer the customers, the above-discussed problems of delay are avoided. Thus, the present inventions permit a base housing to be manufactured at one location and then customized, at a much later date if desired, at a second facility and location. Further, if desired, the customization process can be performed just prior to shipment to a customer.

It will be apparent to one of ordinary skill in the art that the details presented above are beyond what is necessary to practice the present invention. Many variations, implementations and combinations are envisioned and disclosed. The scope of the present inventions is intended to cover all variations, omissions, substitutions and combinations which are and which may become apparent from the disclosed embodiments. The scope of the invention should be extended to the claimed invention and all of its equivalents.

What is claimed is:

1. A collection of parts for assembling an information gathering apparatus, comprising;
   a housing having an optical indicia reading portal;
   a plurality of different types of optical indicia reader, each optical indicia reader of said plurality of different types of optical indicia reader having a size and shape to be housed within said housing to read optical indicia through said optical indicia reading portal;
   a first window frame, suited for use with at least one optical indicia reader of said plurality of different types of optical indicia reader, said first window frame having a size and shape to facilitate coupling with said optical indicia reading portal;
   a second window frame, suited for use with at least one optical indicia reader of said plurality of different types of optical indicia reader, said second window frame having a size and shape to facilitate coupling with said optical indicia reading portal;
   a light-transmissive window having a size and shape to facilitate coupling with said first window frame or with said second window frame;
   said first window frame, comprising a first window receiving portal; and
   said second window frame, comprising a second window receiving portal;
   wherein said first window receiving portal is designed to orient a received light-transmissive window at an angle different from that of a light-transmissive window that is received by said second window receiving portal;
   wherein, after manufacturing of said housing, an information gathering apparatus including any of said plurality of different types of optical indicia reader can be constructed by installing a desired optical indicia reader chosen from said plurality of different types of optical indicia reader and by installing an appropriate window frame and light-transmissive window.

2. The collection of parts for assembling an information gathering apparatus according to claim 1, wherein at least one optical indicia reader of said plurality of optical indicia readers comprises a laser scanner.

3. The collection of parts for assembling an information gathering apparatus according to claim 2, wherein said first window frame is designed for use with a laser scanner.

4. The collection of parts for assembling an information gathering apparatus according to claim 1, wherein at least one optical indicia reader of said plurality of optical indicia readers comprises a digital imager.

5. The collection of parts for assembling an information gathering apparatus according to claim 4, wherein said first window frame is designed for use with a digital imager.

6. The collection of parts for assembling an information gathering apparatus according to claim 1, wherein at least one optical indicia reader of said plurality of optical indicia readers comprises an instantaneous area illumination reader.

7. The collection of parts for assembling an information gathering apparatus according to claim 1, further comprising a window adhesive to secure said light-transmissive window to said first window frame.

8. The collection of parts for assembling an information gathering apparatus according to claim 1, further comprising a frame adhesive to secure said first window frame to said optical indicia reading portal.

9. The collection of parts for assembling an information gathering apparatus according to claim 1, further comprising a window coupling structure to secure said light-transmissive window to said first window frame.

10. The collection of parts for assembling an information gathering apparatus according to claim 1, further comprising a frame coupling structure to secure said first window frame to said optical indicia reading portal.

11. The collection of parts for assembling an information gathering apparatus according to claim 1, wherein the information gathering apparatus is portable.

12. The collection of parts for assembling an information gathering apparatus according to claim 1, wherein said housing is of a size and shape to be held in a hand.

13. The collection of parts for assembling an information gathering apparatus according to claim 1, wherein said first window frame is structured to orient said light-transmissive window at an angle to light generated by an installed optical indicia reader.

14. The information gathering apparatus according to claim 1, wherein said first window frame is structured to orient said light-transmissive window perpendicularly to light generated by an installed optical indicia reader.

15. The collection of parts for assembling an information gathering apparatus according to claim 1, further comprising a plurality of additional window frames, each additional window frame suited for use with a different type of optical indicia reader.

16. A collection of parts for assembling an information gathering apparatus, comprising;
    a housing having an optical indicia reading portal;
    a plurality of different types of optical indicia reader, each optical indicia reader of said plurality of different types of optical indicia reader having a size and shape to be housed within said housing to read optical indicia through said optical indicia reading portal;
    a window frame, suited for use with at least one optical indicia reader of said plurality of different types of optical indicia reader, said window frame having a size and shape to facilitate coupling with said optical indicia reading portal;
    a light-transmissive window having a size and shape to facilitate coupling with said window frame; and
    a plug suited for use when no optical indicia reader of said plurality of different types of optical indicia reader is to be installed in said housing, said plug having a size and shape to facilitate coupling with said optical indicia reading portal;
    said window frame comprising a window receiving portal, wherein said window receiving portal is designed to orient a received light-transmissive window at an angle different from that of a said plug;
    wherein, after manufacturing of said housing, an information gathering apparatus including no optical indicia reader of said plurality of different types of optical indicia reader can be constructed by installing said plug into said optical indicia reading portal.

17. A method of manufacturing an information gathering apparatus that can contain at least one of a variety of different optical indicia readers, comprising the steps of:

manufacturing a housing for an information gathering apparatus, the housing having a portal for reading optical indicia, the manufactured housing being capable of housing an optical indicia reader chosen from a plurality of different types optical indicia readers;

determining which type of optical indicia reader, chosen from the plurality of different types of optical indicia reader; will be installed in the manufactured housing to read optical indicia through the portal, said determining step being performed after said manufacturing step;

selecting a window frame designed for use with a specific type of optical indicia reader;

installing the selected window frame in the portal;

selecting a light-transmissive window; and installing said light-transmissive window in the selected window frame;

wherein said window frame selection is made from a plurality of different window frames based on the angle at which the window frame will position the light-transmissive window relative to the optical indicia reader.

18. The method of claim 17, wherein a window frame designed for use with a laser scanner is selected in said step of selecting a window frame.

19. The method of claim 18, wherein a light-transmissive window designed for use with a laser scanner is selected in said step of selecting a light-transmissive window.

20. The method of claim 17, wherein a window frame designed for use with a digital imager is selected in said step of selecting a window frame.

21. The method of claim 20, wherein a light-transmissive window designed for use with a digital imager is selected in said step of selecting a light-transmissive window.

22. The method of claim 17, wherein a window frame designed for use with an instantaneous area reader is selected in said step of selecting a window frame.

23. The method of claim 22, wherein a light-transmissive window designed for use with an instantaneous area reader is selected in said step of selecting a light-transmissive window.

24. The method of claim 17, wherein the determined type of optical indicia reader comprises an instantaneous area reader.

* * * * *